Figure 1:
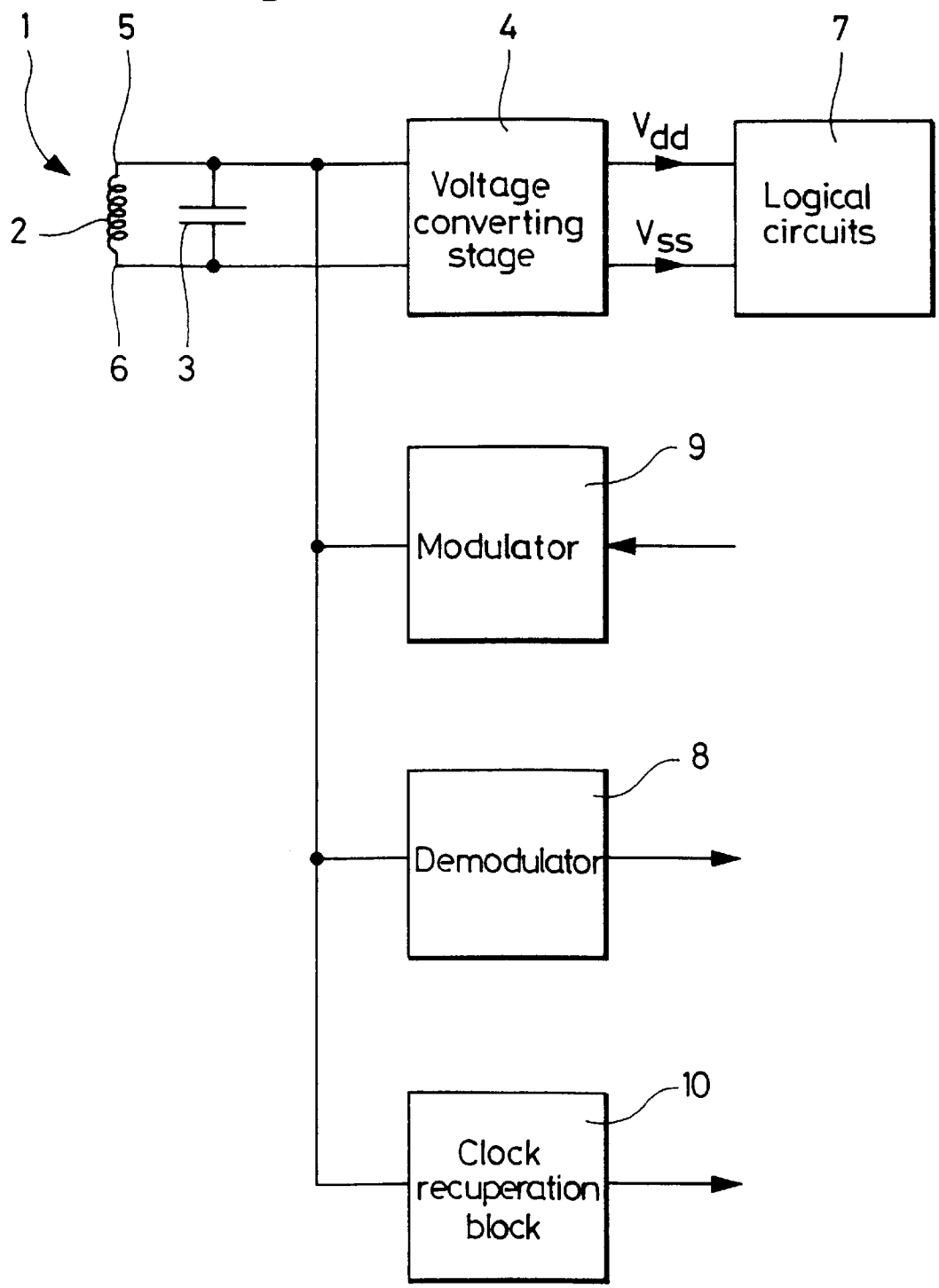

United States Patent

Büsser

[11] Patent Number: 6,011,488
[45] Date of Patent: Jan. 4, 2000

[54] RADIO FREQUENCY INTERFACE DEVICE FOR A TRANSPONDER

[75] Inventor: Wolfgang Büsser, Mougins, France

[73] Assignee: EM Microelectronic-Marin SA, Marin, Switzerland

[21] Appl. No.: 08/983,328

[22] PCT Filed: Jul. 26, 1996

[86] PCT No.: PCT/CH96/00268

§ 371 Date: Jan. 26, 1998

§ 102(e) Date: Jan. 26, 1998

[87] PCT Pub. No.: WO97/05504

PCT Pub. Date: Feb. 13, 1997

[30] Foreign Application Priority Data

Aug. 2, 1995 [FR] France .................................. 95 09414

[51] Int. Cl.$^7$ .................................................. G08B 13/14
[52] U.S. Cl. .................. 340/825.54; 340/825.34; 340/825.31; 340/572.1; 340/572.4; 342/44; 343/895; 343/867
[58] Field of Search .................. 340/825.54, 825.34, 340/572.1, 825.31, 572.4; 342/44; 343/895, 867

[56] References Cited

U.S. PATENT DOCUMENTS

| | | | |
|---|---|---|---|
| 3,478,258 | 11/1969 | Nagai | 321/15 |
| 4,075,632 | 2/1978 | Baldwin et al. | 343/6.8 R |
| 4,196,418 | 4/1980 | Kip et al. | 340/152 T |
| 5,266,926 | 11/1993 | Beigel | 340/825.34 |
| 5,559,507 | 9/1996 | Beigel | 340/825.54 |

*Primary Examiner*—Michael Horabik
*Assistant Examiner*—Yves Dalencourt
*Attorney, Agent, or Firm*—Griffin, Butler, Whisenhunt & Szipl, LLP

[57] ABSTRACT

This radiofrequency interface device (1) for a transponder, comprises a coil (2) forming the antenna of the transponder and a voltage converting circuit (4) connected, on the one hand to the terminals (5, 6) of said coil (2) and, on the other hand, to continuous voltage supply terminals ($V_{dd}$, $V_{ss}$) of an integrated logic circuit (7) of the transponder, and is characterised in that the terminals (5, 6) of the coil (2) are connected to floating potentials with respect to the substrate of the transponder, so that none of the terminals (5, 6) of the coil (2) passes below the potential ($V_{ss}$) of the substrate.

18 Claims, 4 Drawing Sheets

RADIO FREQUENCY INTERFACE DEVICE FOR A TRANSPONDER

The present invention concerns a radio frequency interface device for a transponder, and in particular the voltage converting circuit of such an interface.

The invention is particularly suitable for the radio frequency interface of a transponder used as a contactless identification device.

A device of this type comprises an electromagnetic antenna in the form of an inductive coil of very small dimensions, connected as input/output to an integrated circuit via a voltage converting circuit, providing the continuous voltage supply of the integrated circuit.

Transponders of this type do not have a battery and are intended to exchange information with an interrogation device or an identification device with which they are connected in a wireless manner. The voltage supply which the transponder needs to function is consequently obtained from a radio frequency excitation signal emitted by the interrogation device. This radio frequency signal is rectified in the transponder and the voltage thus produced is used to charge a capacitor forming means for stocking energy. The energy thus stocked is used by the circuits of the transponder for writing information in the logic circuits, in particular the memories, and for modulating a response radio frequency signal intended for the interrogation device when it is reading the transponder.

Such a transponder device is described in the document U.S. Pat. No. 4,196,418. This device comprises to this effect a rectifying circuit allowing to rectify and thus to use the resonance circuit voltage to supply the different components of the device.

Such transponders can be used practically in a large variety of applications, in particular for the identification of objects which are at a distance.

In this context, one of the problems posed resides in the fact that the input voltage of the interface of the transponder determines the limitation of the distance of functioning. i.e. the maximum distance between the emitter or the receiver of an electromagnetic signal and the transponder for allowing the exchange of information between the source and the transponder. To this effect, for increasing the operation distance, it is known in the state of the art to use a voltage doubler at the output of the rectifying circuit, but in such a case, the rectifying diodes of the interface might break down because of the too big inversed voltage caused by this doubler.

The present invention has as aim to remedy these inconveniences, and to propose an interface device capable of increasing the operation distance while thereby avoiding an important inversed tension to be applied to the rectifying diodes of the interface. Furthermore, the invention has as aim to propose a device allowing to incorporate standard protection circuits, this not being possible with a classic voltage doubler.

Another aim of the invention is to propose an interface for transponders capable of generating sufficient current so that the transponder can receive a microprocessor or other integrated circuits which have a relatively high current consumption, such as, in particular a non-volatile memory.

To this effect, the invention has as its object a radio frequency interface for a transponder, comprising a coil forming the antenna of the transponder and a voltage converting circuit connected to, on the one hand, the terminals of said coil and, on the other hand, continuous voltage supply terminals of an integrated logic circuit of the transponder, characterised in that the terminals of the coil are connected to floating potentials with respect to the substrate of the transponder, in such a way that none of the terminals of the coil have a potential which passes below the potential of the substrate, and in that said voltage converter is a voltage tripler which comprises a first rectifier connected to the terminals of the coil and which is constituted by a first diode connected in series with a first capacitor, a second rectifier connected to the terminals of the first diode and constituted by a second diode in series with a second capacitor, and a third rectifier connected to the terminals of the first capacitor and constituted by a third diode in series with a third capacitor.

According to other features of the invention:

the interface comprises a modulation transistor the drain and the source of which are connected to the terminals of the coil, and the grid of which is supplied with a modulation signal coming from the integrated circuit of the transponder.

said modulation transistor is connected in series with a resistance in such a way that the current of the coil varies rapidly thus causing a modulation of the radio frequency field.

advantageously, a substrate diode is connected between a terminal of the coil and the substrate of the transponder, in parallel to said first and second diodes, such as to reduce the writing voltage drop by about 0.7 volts.

preferably, a capacitor is connected to the terminals of the coil, so as to form a resonance circuit which improves the energy transmission between the transponder and an external reader.

The invention also concerns a transponder device comprising an interface device having anyone of the aforementioned features.

The invention will be better understood by reading the detailed description which follows, in combination with the attached drawings in which:

said voltage converter is a voltage tripler which comprises a first rectifier connected to the terminals of the coil and which is constituted by a first diode connected in series with a first capacitor, a second rectifier connected to the terminals of the first diode and constituted by a second diode in series with a second capacitor, and a third rectifier connected to the terminals of the first capacitor and constituted by a third diode in series with a third capacitor.

the interface comprises a modulation transistor the drain and the source of which are connected to the terminals of the coil, and the grid of which is supplied with a modulation signal coming from the integrated circuit of the transponder.

said modulation transistor is connected in series with a resistance in such a way that the current of the coil varies rapidly thus causing a modulation of the radio frequency field.

advantageously, a substrate diode is connected between a terminal of the coil and the substrate of the transponder, in parallel to said first and second diodes, such as to reduce the writing voltage drop by about 0.7 volts.

preferably, a capacitor is connected to the terminals of the coil, so as to form a resonance circuit which improves the energy transmission between the transponder and an external reader.

The invention also concerns a transponder device comprising an interface device having anyone of the aforementioned features.

Figure 2:
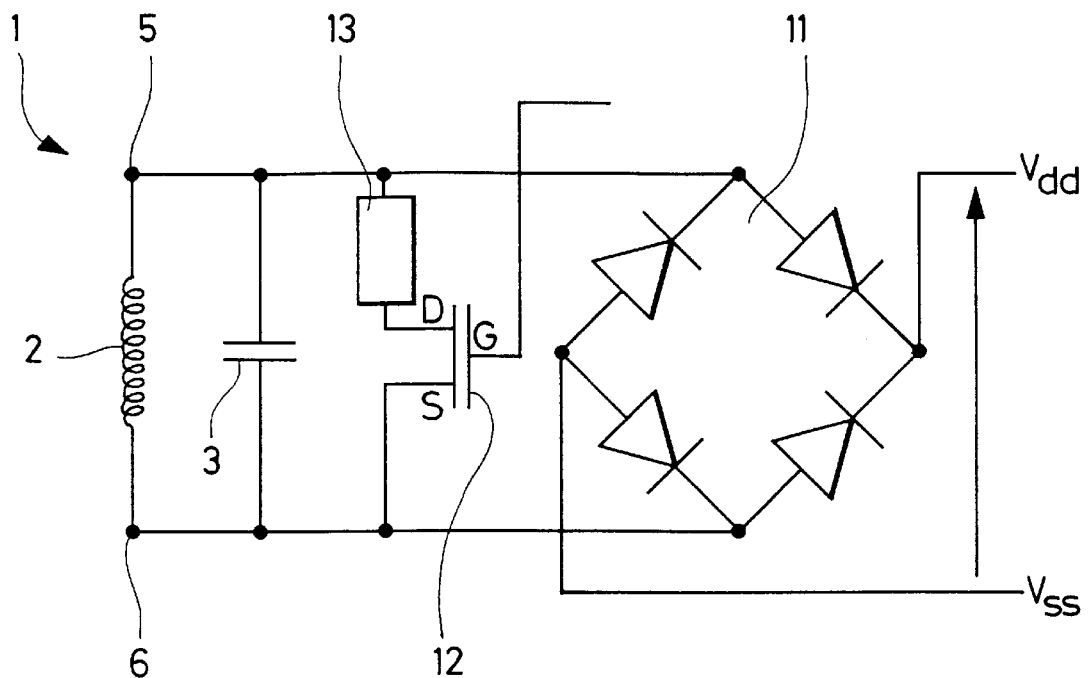
Figure 3:
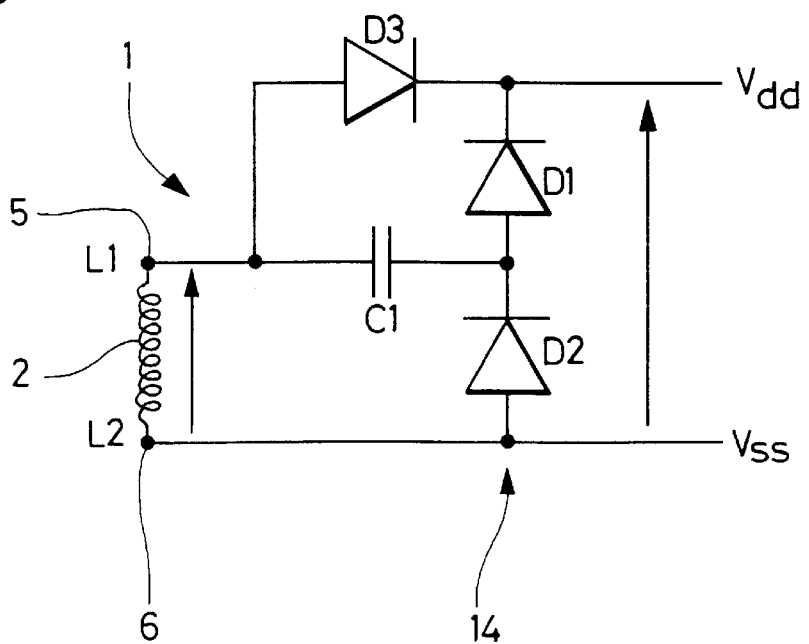
Figure 4:
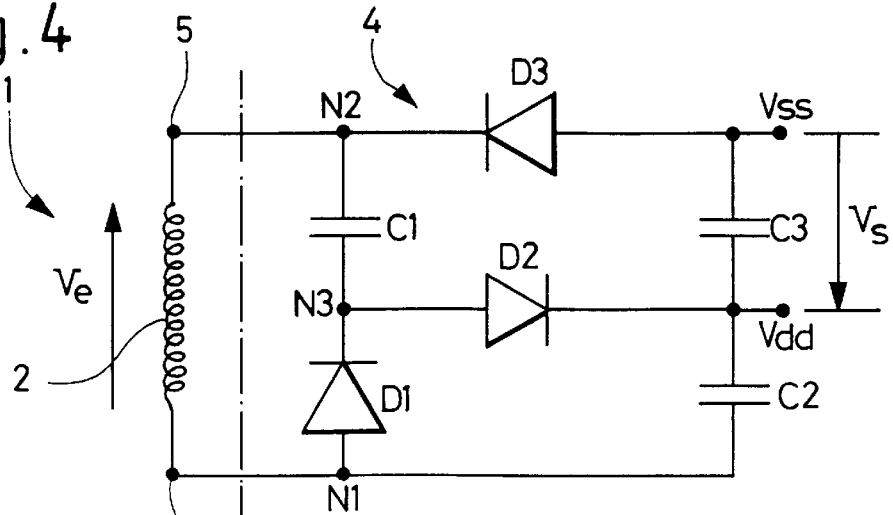
Figure 5:
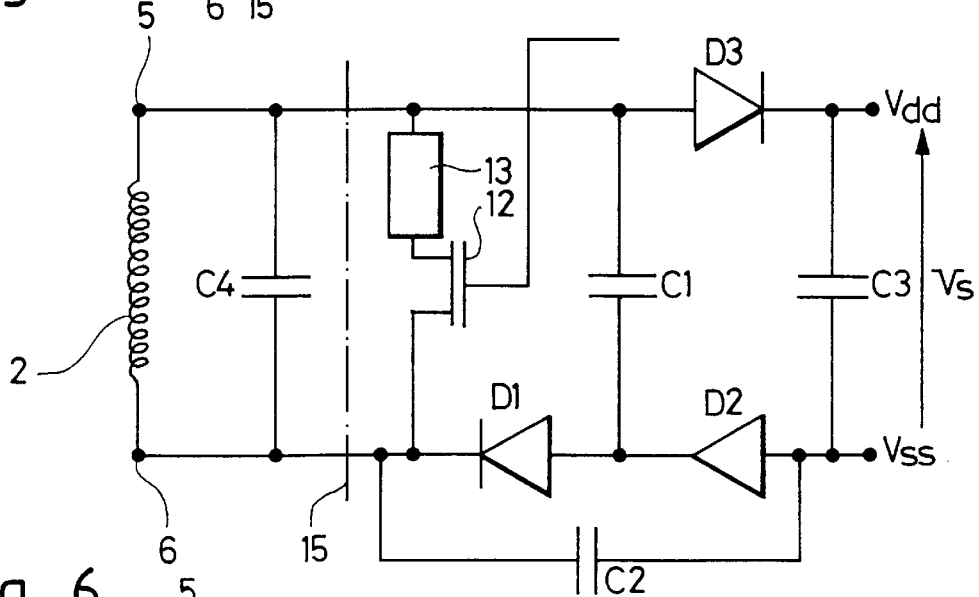
Figure 6:
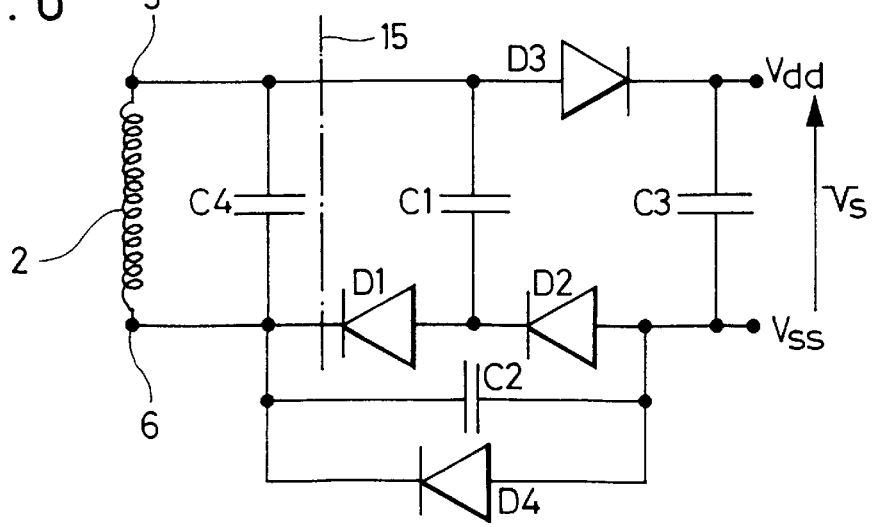
Figure 7:
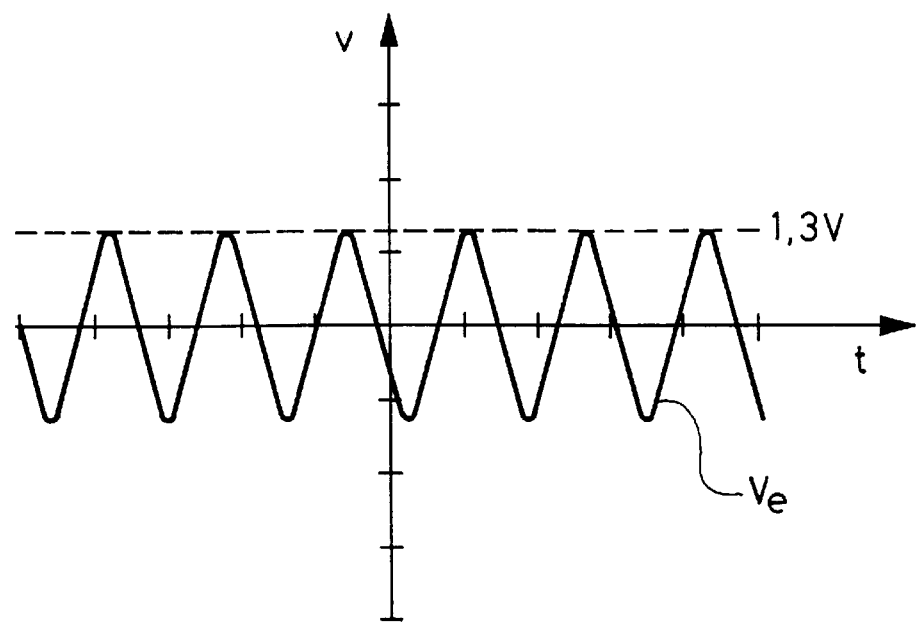

The invention will be better understood by reading the detailed description which follows, in combination with the attached drawings in which:

FIG. 1 is a schematic block diagram representing the principal operational blocks of a transponder, FIG. 2 is a block diagram of the input/output interface of a transponder of the state of the art, using a Graetz-bridge rectifier, FIG. 3 is a block diagram of the input/output interface of a transponder according to the state of the art, using a voltage doubling rectifying stage, FIG. 4 is a block diagram of a first embodiment of the radio frequency interface according to the invention, intended to be used with a transponder, FIG. 5 is a block diagram of a second embodiment of the radio frequency interface according to the invention, FIG. 6 is a block diagram of a third embodiment of the input/output interface according to the invention, FIG. 7 is a time-depending representation of the sinusoidal input signal available at the input of the interface of FIGS. 4 to 6, and FIG. 8 is a time-depending representation of the rectified voltage which is available at the output of the interface of FIGS. 4 to 6.

Reference will now be made to FIG. 1. In this figure, the principal block diagram is represented which shows the main operational blocks of a transponder, and in particular of its radio frequency interface 1. Such an interface comprises an antenna in the form of a coil 2 of small dimensions, preferably connected in parallel to a capacitor 3, and connected to the input of a voltage converting stage 4 which allows to transform the alternating input voltage available at terminals 5, 6 of coil 2, into a continuous voltage (Vdd-Vss) allowing to supply a block of logical circuits 7 of the transponder, consisting for example of a memory or a microprocessor. The input signal available at the terminals of coil 2 is also demodulated, in the writing-direction by a demodulation block 8 for writing the data information towards integrated circuit 7 of the transponder. In a schematical manner, the data intended to be read from the transponder are modulated by a modulation block 9 feeding the coil 2 for the reading of data from the transponder by a contactless identification device (not represented).

Finally, the writing signal towards the transponder is used by a clock recuperation block 10 allowing to generate the clock signal for the logical circuit 7 of the transponder, which is synchronous with the clock signal of the external identification device.

The invention concerns more particularly the voltage converter 4 of the radio frequency interface 1 of the transponder.

Reference will now be made to FIG. 2, which represents a block diagram of the input/output interface according to the state of the art, in which the elements which are identical or similar to those in FIG. 1 are given the same reference number. The block diagram of FIG. 2 uses a Graetz-bridge 11 connected as input to terminals 5 and 6 of coil 2, an generating at its output a continuous voltage Vdd-Vss.

A transistor 12 has also been represented in this figure and is intended to modulate the radio frequency field by modulating the current of coil 2 with the help of binary information which is to be read from the transponder and which is brought to the grid G of the transistor. Transistor 12 is connected in series with a resistance 13.

The assembly of interface 1 to Graetz-bridge 11 is not very efficient when using highly resistive charges. In fact, the output voltage (Vdd-Vss) of the bridge is inferior by at least a diode voltage drop (0.7 volts) to the amplitude of the input voltage of coil 2. However, as the continuous voltage is relatively low during modulation, the modulation transistor 12 is highly resistive in low fields. Due to this, it is not recommended to add a resistance 13 in series with the transistor 12. This has as a result that the low field modulation resistance is high, which causes a slow decreasing of the current of coil 2 which may thus provoke incorrect clock pulses. This effect becomes even more critical due to the fact that the modulation only takes place during a half-wave of the coil voltage. This results in a shifted operation point of the clock extraction circuit 10.

Reference is now made to FIG. 3, representing another block diagram of an input/output interface according to the state of the art, which uses a voltage doubling rectifying stage 14, a terminal 6 of coil 2 being connected to the substrate of the logical circuits of the transponder. The voltage doubler 14 is more efficient than the assembly of FIG. 2 for low coil voltages, so that the problems related to demodulation are less apparent. The operation distance is thus greater due to the increased modulation voltage.

However, as the voltage of terminal 5 of coil 2 can become inferior to the substrate potential Vss, this interface requires a complex modulation circuit presenting breakdown risks. For the same reason, it is not possible to add a standard protection circuit to the second terminal 5 of coil 2.

Furthermore, the diode D3 must be added so as to generate the high current which is required during writing. This diode is exposed to a relatively high inversed voltage, which is about three times the amplitude of the input voltage of the coil, when the voltage doubler 14 is connected to a low charge (not represented). This constitutes an important inconvenience for concepts using polydiodes, which present relatively low breakdown voltages.

A radio frequency interface 1 according to the invention is schematically shown in FIG. 4. As before, interface 1 comprises a coil 2 and a voltage converter 4 delimited by a dotted line 15. According to the invention, the converter 4 is assembled by way of a voltage multiplier, more specifically in the example shown as a voltage tripler, although it is to be noted that this example does not have a limitative character, because other voltage multiplication ratios may be used by the skilled person as a function of the specific needs for the intended use. By voltage multiplier it is meant that the amplitude of the continuous output voltage after rectifying Vs=Vdd-Vss is approximately a whole multiple of the amplitude of the alternating input voltage Ve. In the example represented, voltage converter 4 comprises a first rectifier D1, C1 which charges a capacitor C1 with a voltage having an amplitude which is equal to the amplitude of the input voltage. The rectifying stage D1, C1 is followed by a second rectifying stage D2, C2 which again rectifies the output voltage of the first rectifier, so that the output voltage of the second rectifier at the terminals of capacitor C2 now has an amplitude double that of the input voltage Ve. Finally, the second rectifying stage D2, C2 is followed by a third rectifying stage D3, C3, which has an output voltage Vs=Vdd–Vss at the terminals of C3 and which is now a continuous voltage having an amplitude three times that of the alternating input voltage.

Figure 8:
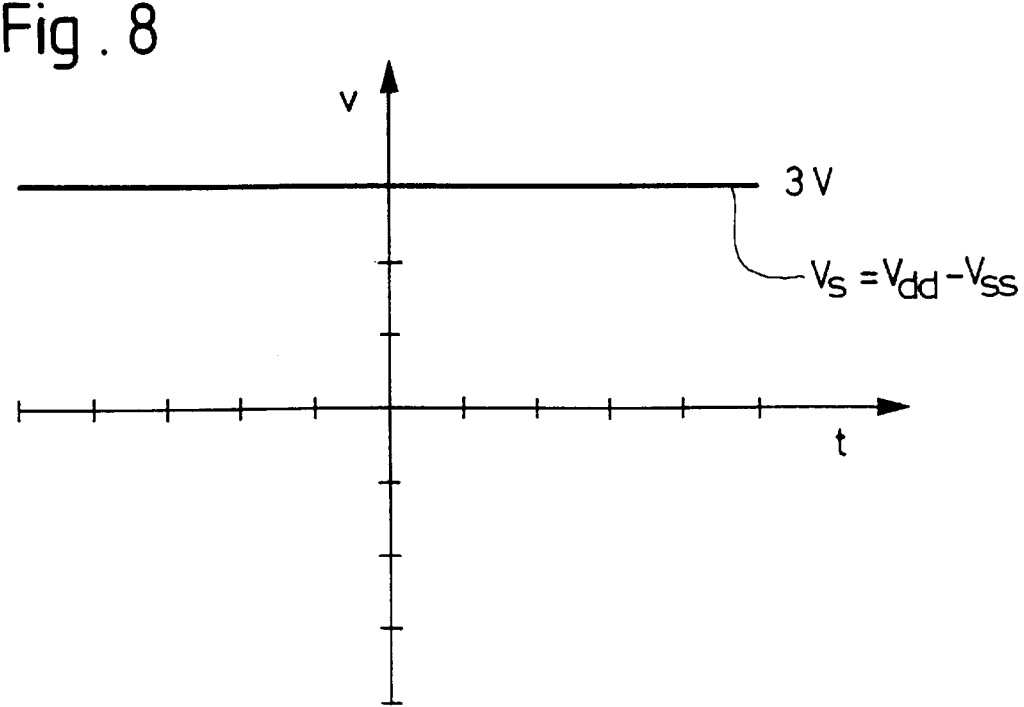

FIGS. 7 and 8 represent respectively the actual input signal Ve and the output signal Vs. The input voltage of a radio frequency interface for a transponder generally has an amplitude which is between 1 and 20 volts and has a frequency of about 125 kHz to several MHz, and the amplitude of the desired continuous output voltage is about 1 to 5 volts. The input voltage has in the shown example an amplitude of about 1.3 volts. The continuous output voltage Vs has an amplitude of 3 volts which is obtained with readily available components (C1=C2=560 pF; C3=1 nF), this being close to the theoretical 3.9 volts which would be obtained with ideal components, and being much greater than the continuous voltage which would be obtained when using a Graetz-bridge converter (FIG. 2) or a voltage-doubler (FIG. 3). It follows from this that the radiofrequency interface according to FIG. 4 allows, for an identical input voltage, to increase the operation distance of the device.

According to the invention, the assembly of the voltage converter 4 is obtained in such a way that terminals 5, 6 of coil 2 possess a floating potential with respect to the substrate potential Vss. As such, contrary to the assembly of the state of the art (FIG. 2), none of the terminals 5, 6 of coil 2 will have a potential dropping below this potential Vss, so that none of the diodes of the rectifying stages are exposed to an inversed voltage amplitude which is larger than the double amplitude of the input voltage, so that the risk of reaching the breakdown voltage of the diodes of the rectifier stages is diminished, even when using polydiodes.

FIG. 5 represents a variant of the interface 1 of FIG. 4, in which the modulation transistor 12 of the voltage converter is represented as well as a resistance 13 connected in series with this transistor. This very simple modulation arrangement is possible due to the fact that during the normal operation of interface 1, non of the terminals 5, 6 of coil 2 presents a potential which is situated outside of the range consisting of between Vss–0.7 volts and Vdd+0,7 volts.

For the same reasons, the usual electrostatic decharging protection devices may be connected to the two terminals of coil 2.

Furthermore, due to the fact that the continuous output voltage Vs is greater than that of the interface of FIG. 2, the modulation transistor 12 presents a lower resistance during the conductance state, so that a resistance 13 may be used to obtain a fast decrease of the current of coil 2 during all operation conditions. This fast decrease results in a signal which is easily detectable in the external reading device, while at the same time reducing the risk of erroneous clock signals in interface 1, because there is always a sufficient voltage amplitude between terminals 5, 6 of the coil for extracting the clock signal under good conditions.

It is to be noted that FIG. 5 further represents a capacitor C4 connected to the terminals of coil 2, so as to form between the coil and capacitor C4 a resonance circuit which has a resonance frequency which is the same as that of the electromagnetic field, allowing to increase the coupling factor and thus to use less energy for transmitting information between the transponder and the external reading device. Furthermore, the polarity of diodes D1, D2, D3 is inversed with respect to that corresponding to FIG. 4, this inversion being due to a p-type junction technology rather than an n-type.

FIG. 6 represents another variant of the interface according to the invention, in which the modulation transistor 12 has not been shown for reasons of simplicity. In the embodiment represented, the parasite diode D4 which is present on the substrate between coil 2 and the output of interface 1 has been taken into account. According to the invention, this diode D4 is used as a simple alternating rectifier, allowing to reduce by 0.7 volts the voltage drop during the writing towards the transponder. In fact, in this case, instead of having D1, D2, D3 connected in series, there are only D3 and D4, so that the continuous output voltage Vs is even larger than was the case for FIG. 5. Furthermore, as substrate diodes of the type of D4 have a breakdown voltage which is even larger than that of the polydiodes which have a floating voltage with respect to the substrate of the transponder, there is no risk of breakdown.

From the above, it follows that the radiofrequency interface device according to the invention perfectly fulfils the set aims. It allows to combine the advantages of the known assemblies of a Graetz-bridge and a voltage doubler, while at the same time avoiding their inconveniences. In particular, non of the diodes of the rectifying stage of the interface are exposed to an inversed voltage which is superior to twice that of the voltage at the terminals of the input/output coil. Due to this fact, the breakdown risk is less than that would be the case with the voltage doubling interface, even when using polydiodes.

Furthermore, the continuous output voltage is higher when having the same input voltage at the coil. It results from this that the operation distance of the transponder is greatly increased, i.e. from several centimeters to several meters. Furthermore, the current available for the transponder is higher, so that the transponder may comprise a microprocessor.

I claim:

1. A radio frequency interface device for a transponder, said device comprising a coil forming the antenna of the transponder and a voltage converting circuit connected to terminals of said coil and to continuous voltage supply terminals of an integrated logic circuit of the transponder, the device being characterized in that the terminals of the coil are connected to floating potentials with respect to a substrate of the transponder in such a way that none of the terminals of the coil have a potential which passes below a potential of the substrate, and in that said voltage converting circuit is a voltage tripler which comprises a first rectifier connected to the terminals of the coil, the first rectifier comprising a first diode connected in series with a first capacitor, a second rectifier connected to terminals of the first diode, the second rectifier comprising a second diode connected in series with a second capacitor, and a third rectifier connected to terminals of the first capacitor, the third rectifier comprising a third diode connected in series with a third capacitor.

2. A device according to claim 1, characterized in that it comprises a modulation transistor having a drain and a source connected to the terminals of the coil and a grid supplied with a modulation signal coming from the integrated logic circuit of the transponder.

3. A device according to claim 2, characterized in that said modulation transistor is connected in series with a resistance, in such a way that the current of the coil varies rapidly so as to cause a modulation of a radio frequency field produced by the coil.

4. A device according to claim 1, characterized by the fact that a substrate diode is connected between a terminal of the coil and the substrate of the transponder, in parallel to said first and second diodes so as to reduce a writing voltage drop by about 0.7 volts.

5. A device according to claim 2, characterized by the fact that a substrate diode is connected between a terminal of the coil and the substrate of the transponder, in parallel to said first and second diodes so as to reduce a writing voltage drop by about 0.7 volts.

6. A device according to claim 3, characterized by the fact that a substrate diode is connected between a terminal of the coil and the substrate of the transponder, in parallel to said first and second diodes so as to reduce a writing voltage drop by about 0.7 volts.

7. A device according to claim 4, characterized in that a capacitor is connected to the terminals of the coil so as to form a resonance circuit which improves the energy transmission between the transponder and an external reader.

8. A device according to claim 5, characterized in that a capacitor is connected to the terminals of the coil so as to form a resonance circuit which improves the energy transmission between the transponder and an external reader.

9. A device according to claim 6, characterized in that a capacitor is connected to the terminals of the coil so as to form a resonance circuit which improves the energy transmission between the transponder and an external reader.

10. A transponder device, characterized in that it comprises an interface device according to claim 1.

11. A transponder device, characterized in that it comprises an interface device according to claim 2.

12. A transponder device, characterized in that it comprises an interface device according to claim 3.

13. A transponder device, characterized in that it comprises an interface device according to claim 4.

14. A transponder device, characterized in that it comprises an interface device according to claim 9.

15. A transponder device according to claim 1, characterized in that it comprises a microprocessor.

16. A transponder device according to claim 2, characterized in that it comprises a microprocessor.

17. A transponder device according to claim 3, characterized in that it comprises a microprocessor.

18. A transponder device according to claim 9, characterized in that it comprises a microprocessor.

* * * * *